June 21, 1966 D. E. GRISWOLD ETAL 3,256,905
SINGLE AND MULTIPLE RATE-OF-FLOW CONTROL VALVES
Filed Dec. 19, 1962 7 Sheets-Sheet 1
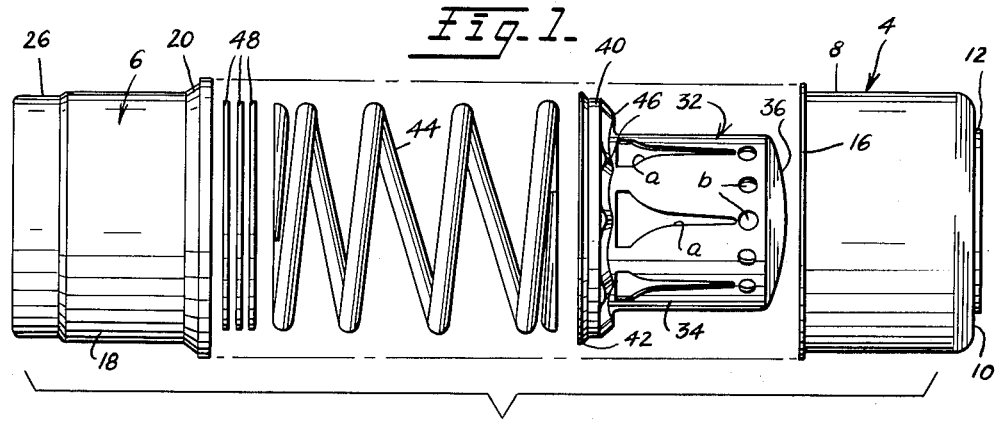
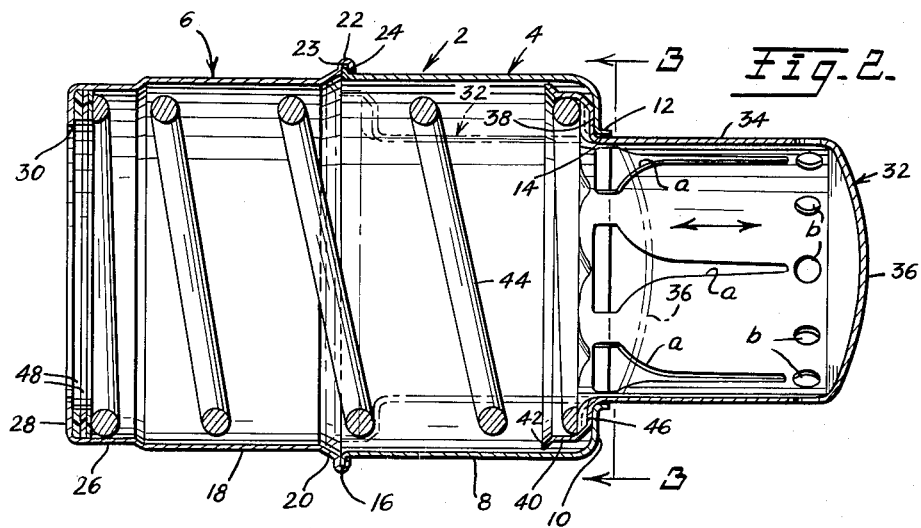
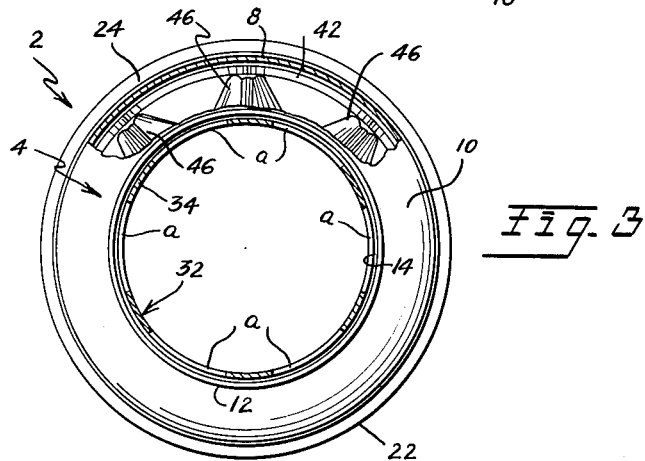
INVENTORS
David E. Griswold
James L. Wingert
ATTORNEY June 21, 1966  D. E. GRISWOLD ETAL  3,256,905
SINGLE AND MULTIPLE RATE-OF-FLOW CONTROL VALVES
Filed Dec. 19, 1962  7 Sheets-Sheet 3
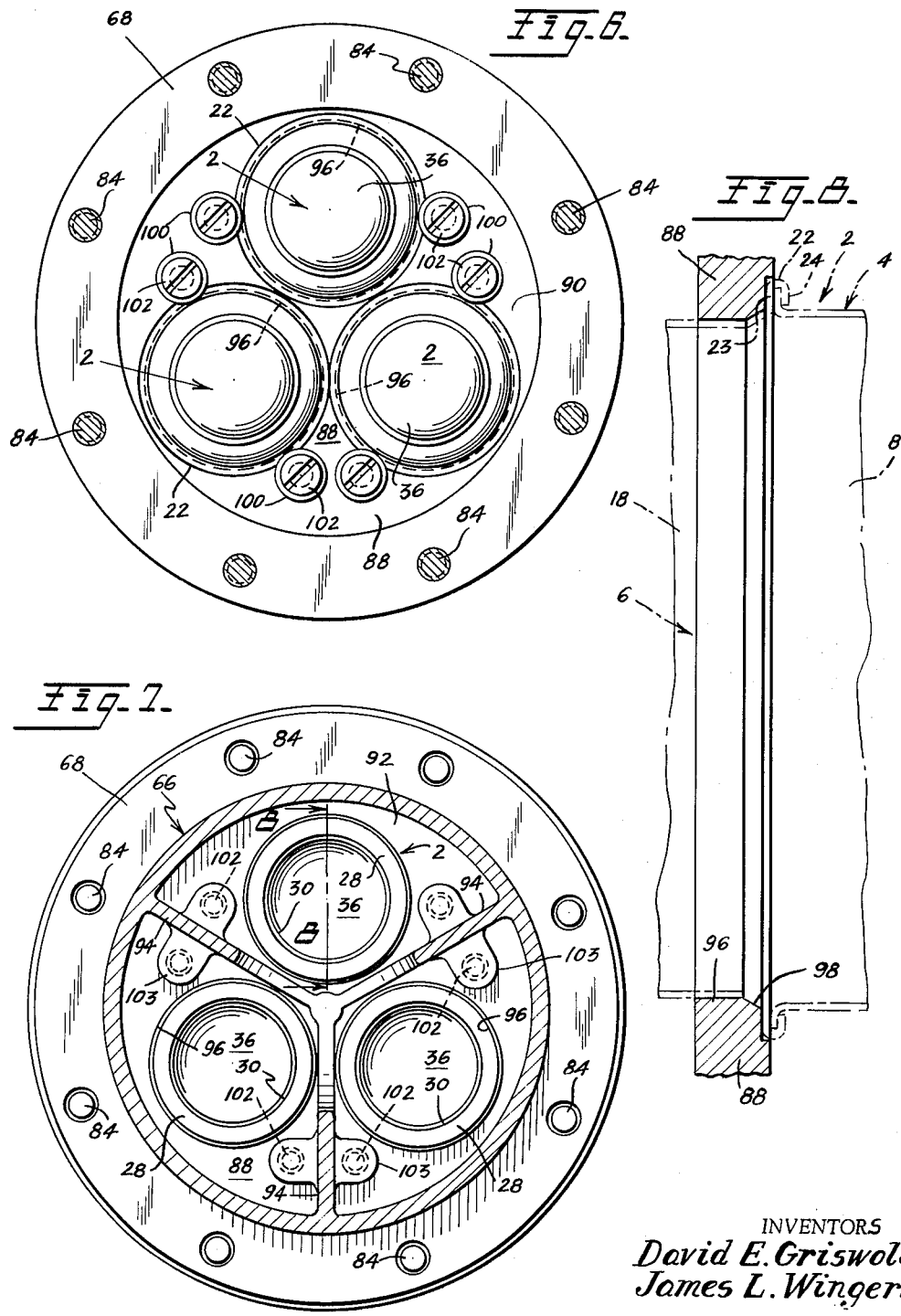
INVENTORS
David E. Griswold
James L. Wingert
ATTORNEY

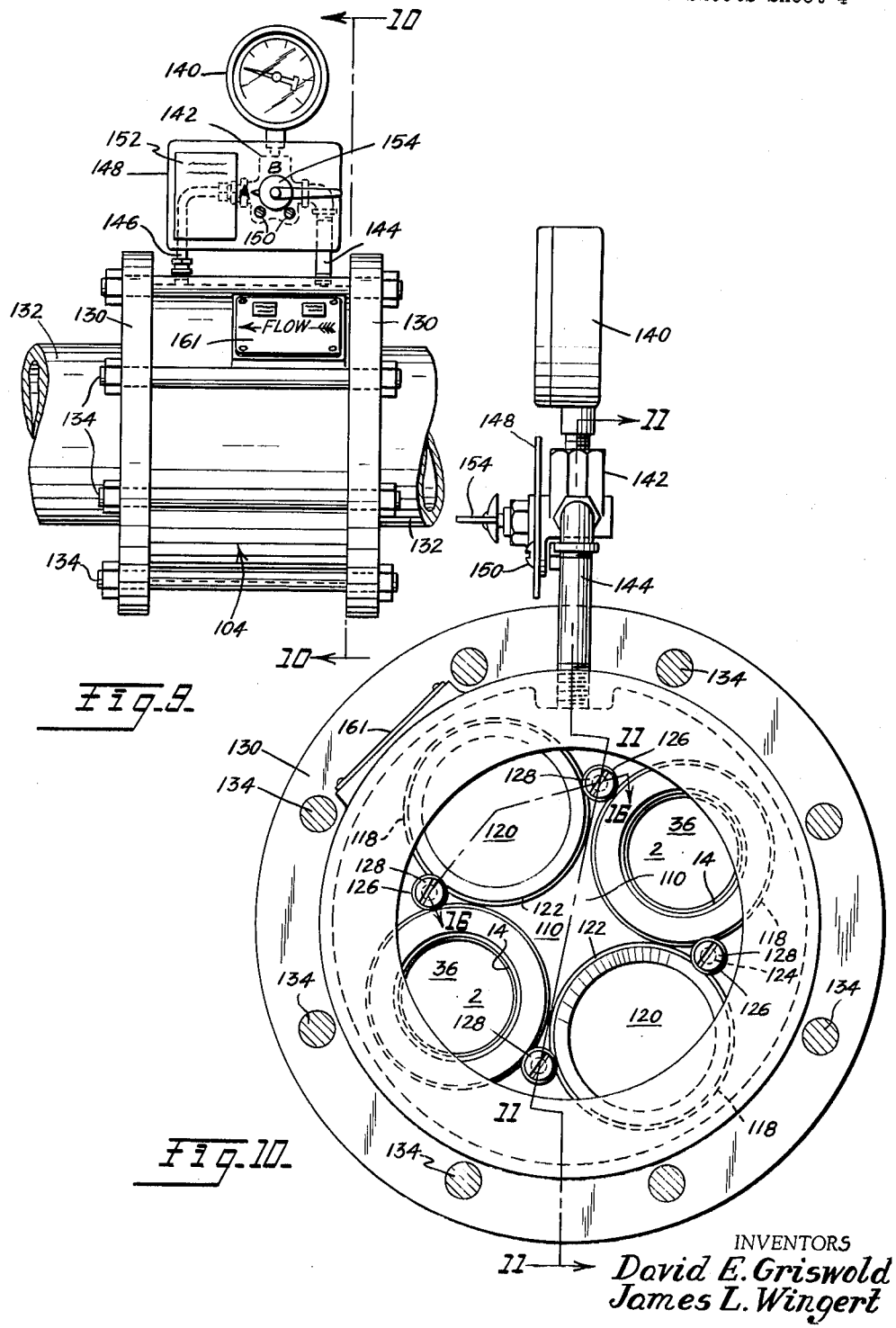

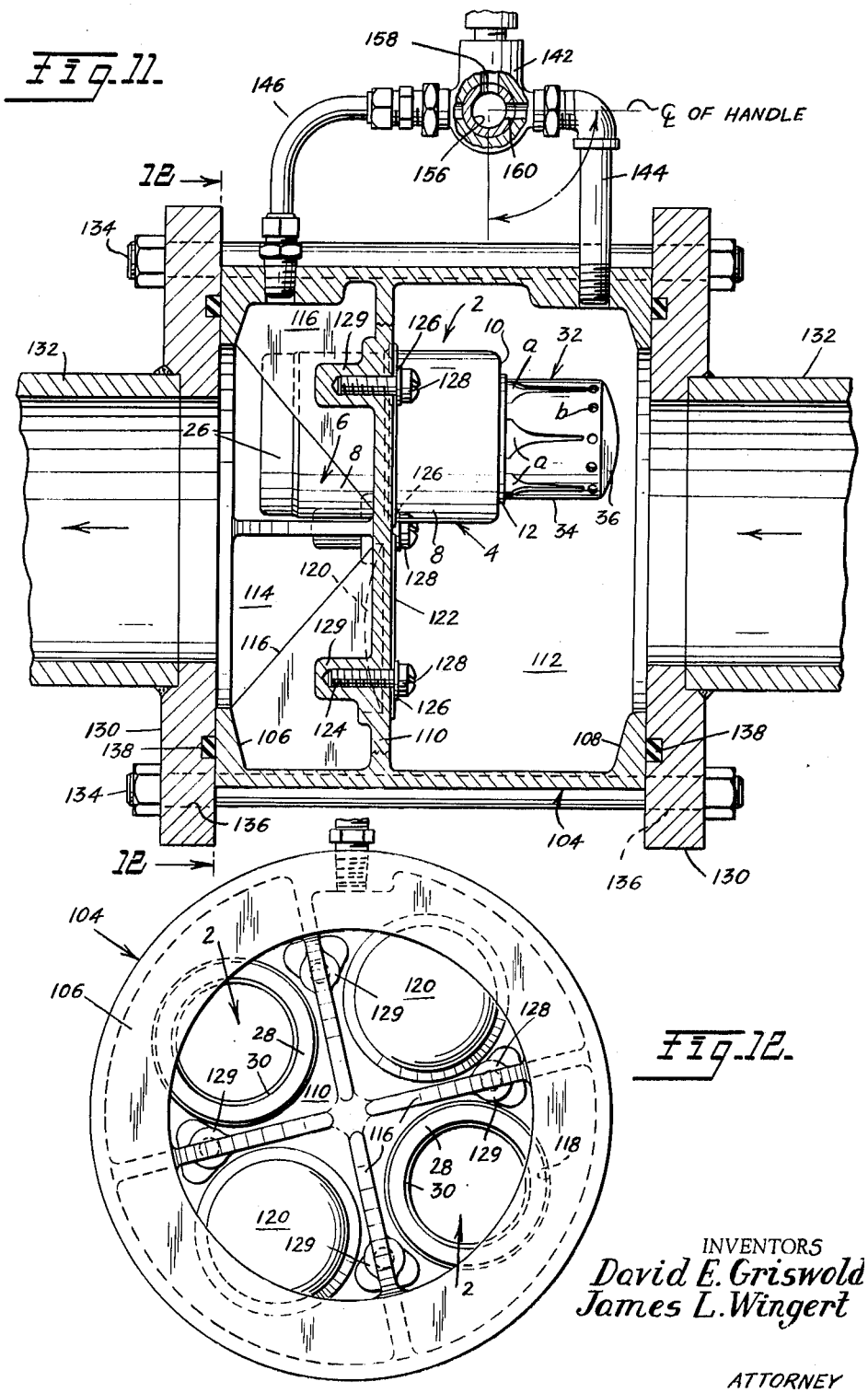

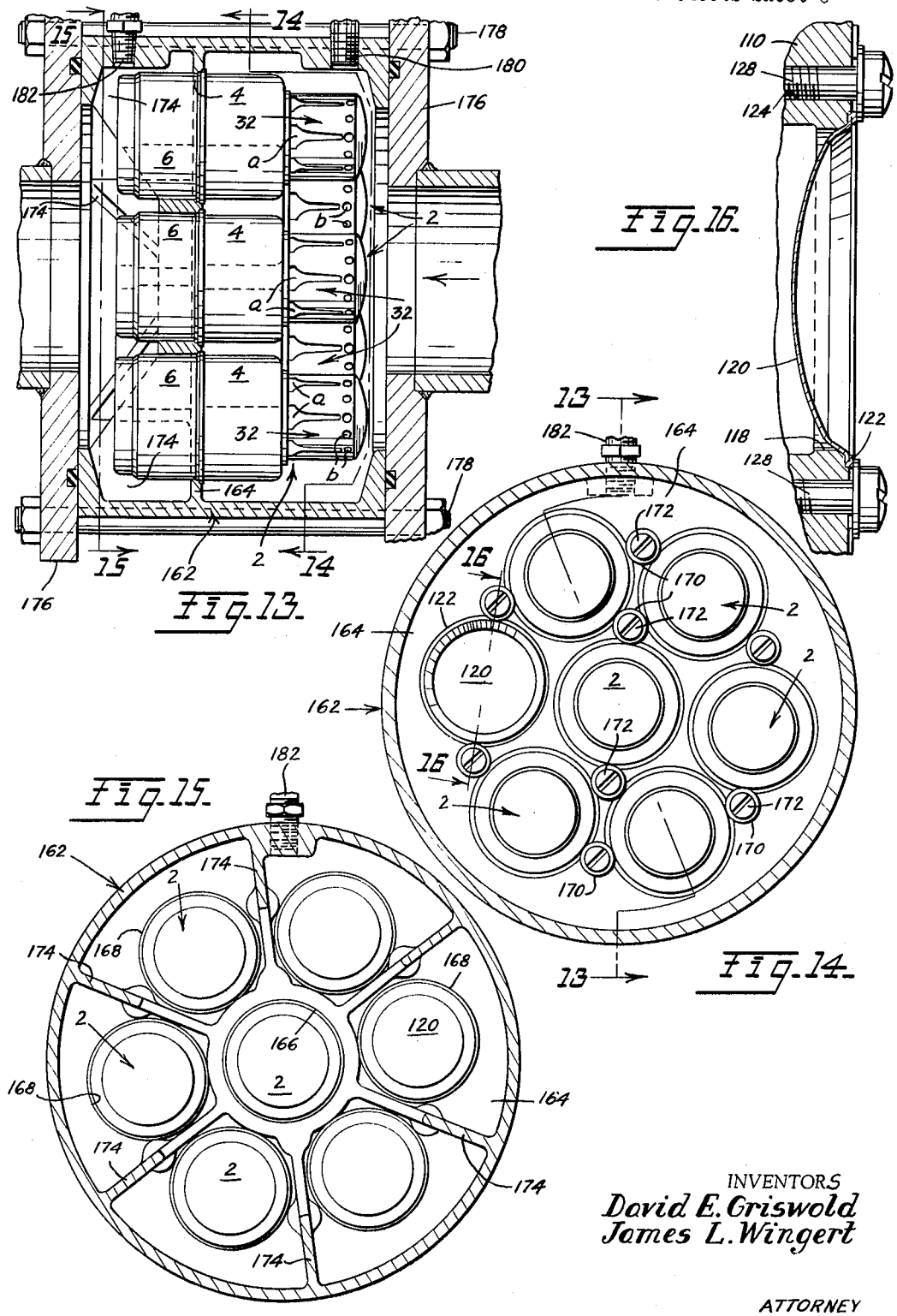

June 21, 1966   D. E. GRISWOLD ET AL   3,256,905
SINGLE AND MULTIPLE RATE-OF-FLOW CONTROL VALVES
Filed Dec. 19, 1962   7 Sheets-Sheet 7

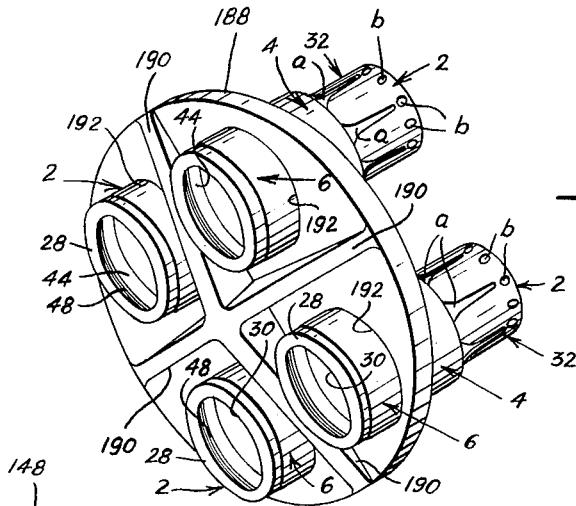

*Fig.17.*

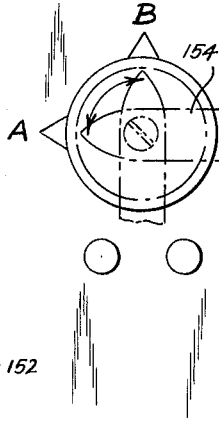

*Fig.18.*

| FLOW RATE CHART | |
|---|---|
| PRESSURE DIFFERENTIAL (DIFFERENCE BETWEEN A & B) (PSI) | FLOW RATE IN GALLONS PER MINUTE |
| ½ | 72 |
| 1 | 95 |
| 1½ | 120 |
| 2 | 135 |
| 2½–32 | 150 |
| 33 | 150 |
| 35 | 153 |
| 45 | 170 |

DETERMINE FLOW RATE BY THE FOLLOWING STEPS 1-2-3
1. TURN POINTER TO POSITION "A" AND READ PRESSURE
2. TURN POINTER TO POSITION "B" AND READ PRESSURE
3. DETERMINE DIFFERENCE BETWEEN PRESSURE READING "A" AND PRESSURE READING "B" THIS DIFFERENCE IS THE PRESSURE DIFFERENTIAL SHOWN WITH CORRESPONDING FLOW RATE ON THE FLOW RATE CHART.

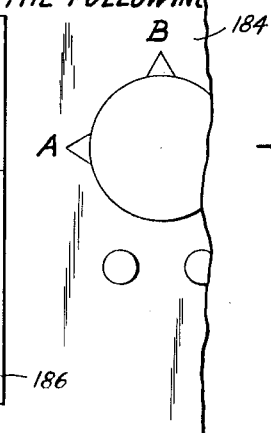

*Fig.19.*

| FLOW RATE CHART | |
|---|---|
| PRESSURE DIFFERENTIAL (DIFFERENCE BETWEEN A & B) (PSI) | FLOW RATE IN GALLONS PER MINUTE |
| 1 | 60 |
| 2 | 85 |
| 3 | 105 |
| 4 | 120 |
| 5 | 135 |
| 6 | 145 |
| 7–140 | 155 |
| 150 | 165 |

INVENTORS
David E. Griswold
James L. Wingert

ATTORNEY

United States Patent Office 3,256,905
Patented June 21, 1966

3,256,905
SINGLE AND MULTIPLE RATE-OF-FLOW CONTROL VALVES
David E. Griswold and James L. Wingert, Costa Mesa, Calif., assignors to Griswold Controls, Costa Mesa, Calif.
Filed Dec. 19, 1962, Ser. No. 245,928
15 Claims. (Cl. 137—454.2)

The present invention relates to flow control devices and, in particular, to flow control devices that will maintain a constant flow rate over a wide range of variations in line pressure.

The invention further relates to an insert or cartridge constituting a unitary rate of flow control valve or assembly, which may be designed for different capacities, and whereby substantially any desired maximum flow rate can be obtained by selecting one or more inserts whose total flow capacity will aggregate the maximum flow rate desired, and installing said insert or inserts in a suitable housing.

Each of the rate of flow control inserts is designed to operate under a wide pressure differential range of about 2 to 32 p.s.i., or 6 to 140 p.s.i., depending upon the flow capacity desired, and to maintain substantially constant the desired flow rate throughout the entire pressure differential range, notwithstanding variations in upstream pressure. Higher or lower pressure differential ranges than specified may be provided, particularly, lower ranges with a full rated flow capacity at a pressure range of 6 inches to 16 feet of water head differential.

The present invention relates to a basic rate of flow control insert adapted to be mounted as a preassembled unit within a pipe to control the rate of flow of liquid through the pipe; or in a pipe nipple; or mounted singly or in multiples upon a plate to be disposed within the housing of a gasoline water separator, filter, or other equipment; or to be mounted singly or in multiples within a housing, which itself can be connected in a pipe line.

Another important feature of the present invention is that it provides one or more forms of basic housing design, in which housing the required number of rate of flow control inserts can be mounted to provide the maximum desired flow rate, and wherein any opening in the housing not occupied by one of the inserts can be blanked off by an insert blank to prevent flow through such opening.

The basic rate of flow control insert may be designed to provide maximum flow rates varying from 10 to 150 g.p.m. or more. If, for example, a maximum flow rate of 150 g.p.m. is desired, one 150 g.p.m. insert or two 75 g.p.m. inserts may be mounted in a housing having a plurality of openings by mounting each of the inserts in separate openings and blanking off any extra openings. For example, if a housing having four openings is used and two 75 g.p.m. inserts are each mounted in an opening, two of the openings would be blanked off. Thus, the present invention provides extreme versatility through the use of simple and basic components to provide substantially any maximum flow rate desired. Moreover, the foregoing is accomplished by using a minimum of parts, with the result that a housing containing flow control inserts designed in accordance with the present invention is much smaller, cheaper, and weighs a great deal less than a conventional valve having the same rated maximum flow capacity.

The principal object of the invention is to provide an accurate and dependable flow rate control device that is directly responsive to the differential pressure acting on the valve element of the device to change its position, as required, to automatically maintain a constant rate of flow through the device, notwithstanding substantial changes in line pressure effective upon said device.

Another object is to provide a flow control device together with simple means for determining the flow rate through the device at any given time, including any period during which the flow rate is less than the minimum rated capacity.

Another object is to provide flow control means that is capable of delivering high capacity flow rates at unusually low pressure differentials, for example, a flow rate of 150 gallons per minute at a pressure differential of 2 pounds per square inch.

A further object is to provide a rate of flow control insert or valve unit, wherein the maximum flow capacity is determined by component selection and wherein the component parts are permanently assembled into a cartridge-like structure, thereby enabling the same to be handled and installed as a unit.

A further object is to provide a member, plate, housing or other means for receiving one or more of the present rate of flow control inserts, together with means for quickly securing the inserts to the part with which they are to be associated.

Still another object is to provide housing means to receive a rate of flow control insert designed so that the pressure within the housing will act to maintain said insert in place in said housing.

A still further object is to provide basic housing means having multiple openings for receiving rate of flow control inserts and wherein unused openings can be blanked off to provide an assembly that will control the rate of flow of liquid through the housing at a desired maximum rate greater than the rated capacity of any one of the flow control inserts, and whereby the same housing means can be used to satisfy a wide range of flow requirements.

Still another object is to provide a rate of flow control device having means for sensing and providing a pressure reading to determine the pressure differential across said device, and having means wherefrom the then occurring flow rate can be ascertained from the existing pressure differential.

Other objects and features of the invention will be apparent from the following description taken in conjunction with the accompanying drawings in which:

FIG. 1 is an exploded view illustrating the basic component parts of the rate of flow control insert or valve of the present invention;

FIG. 2 is a longitudinal sectional view showing the components of FIG. 1 in their relative relation when assembled as a cartridge-type unit;

FIG. 3 is a sectional view taken on the line 3—3 of FIG. 2, with a portion of the housing broken away to illustrate certain details of the movable valve element;

FIG. 6 is a vertical sectional view taken on the line 6—6 of FIG. 5, and illustrating the housing as it appears with its end cover removed;

FIG. 7 is a vertical sectional view taken on the line 7—7 of FIG. 5, particularly showing the reinforcing webs for the wall upon which the rate of flow control inserts are mounted;

FIG. 8 is an enlarged fragmentary sectional view showing a wall opening and a seat formed on the opening for receiving one of the valve units, a fragment of a rate of flow control insert being shown in dot-and-dash lines;

FIG. 9 is an elevation view of a basic, cylindrical housing design for receiving a maximum of four rate of flow control inserts, and equipped with means for ascertaining any existing flow rate, and adapted to be mounted between the flanges of adjacent pipe sections;

FIG. 10 is a sectional view showing the right end of the housing, taken on the line 10—10 of FIG. 9 and illustrating the manner in which two rate of flow control inserts and two insert blanks can be mounted in the cylindrical housing shown in FIG. 9;

FIG. 11 is a vertical, longitudinal sectional view taken through the housing on the line 11—11 of FIG. 10;

FIG. 12 is a transverse vertical sectional view showing the left end of the housing, taken on the line 12—12 of FIG. 11;

FIG. 13 is a vertical, longitudinal sectional view on the line 13—13 of FIG. 14, through a cylindrical housing generally similar to that shown in FIG. 9, except that it is designed to receive as many as seven rate of flow control inserts;

FIG. 14 is a vertical sectional view taken on the line 14—14 of FIG. 13 particularly illustrating the compact arrangement of the rate of flow control inserts and the means for securing the same in the housing;

FIG. 15 is a vertical sectional view taken on the line 15—15 of FIG. 14 and particularly showing the reinforcing webs for the mounting wall of the housing;

FIG. 16 is a fragmentary sectional view taken on the line 16—16 of FIGS. 10 and 14, illustrating the manner in which a blank is mounted in one of the openings in lieu of a rate of flow control insert;

FIG. 17 is a perspective view illustrating a circular plate designed to receive as many as four rate of flow control inserts, and which is adapted to be mounted within any housing wherein a rate of flow control device is desired;

FIG. 18 is a view of a typical panel that may be associated with flow rate determining means, as illustrated schematically in FIG. 9;

FIG. 19 is a view of a similar panel that may be associated with the device shown in FIG. 13.

Figure 4:
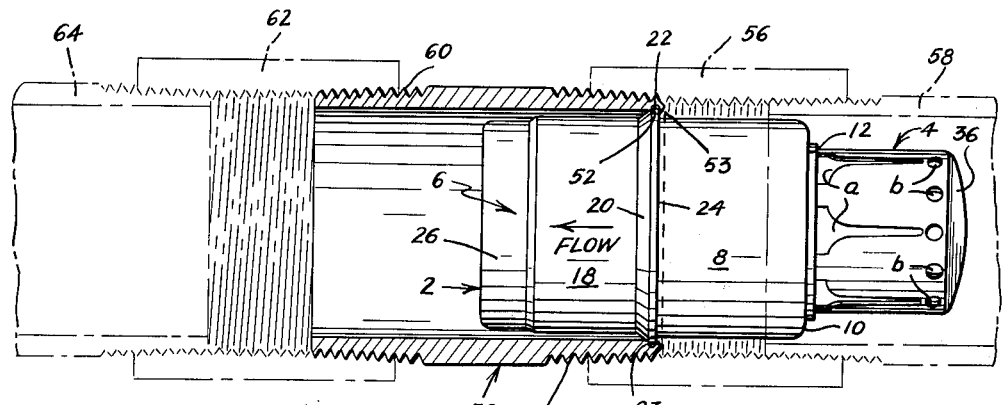
FIG. 4 is a view partly in section, illustrating the manner in which the present rate of flow control insert can be mounted in a pipe nipple and connected in a pipe line, the pipe line being illustrated in dot and dash lines.
Figure 5:
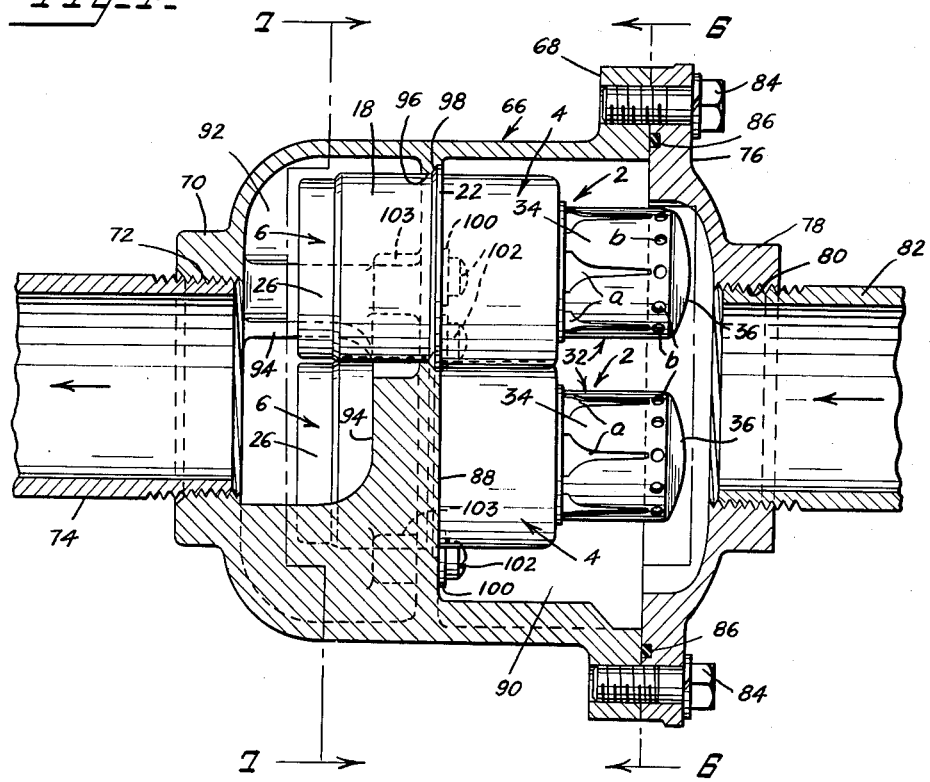
FIG. 5 is a vertical sectional view through a housing designed to receive a maximum of three rate of flow control inserts embodying the present invention.

Referring to FIGS. 1 to 3 of the drawings, the basic rate of flow control insert or valve unit is generally identified by the numeral 2 and comprises a housing or casing consisting of a cylindrical male section 4 and a cylindrical female section 6.

The section 4 comprises a cylindrical wall 8 and an end wall 10 provided with an axially extended flange 12 surrounding a circular opening 14. The opposite end of the wall has an outwardly extended flange 16. The section 6 includes a cylindrical wall 18 which is outwardly flared at 20 on an angle of about 30°, and terminates in a flange 22 that includes a lateral portion 23 that serves as a seat for the flange 16, and a rim portion 24 that is crimped or bent over the flange 16 to permanently secure the housing sections 4 and 6 together. The section 6 further includes a reduced-diameter, cylindrical portion 26 at the opposite end thereof, which terminates in an inwardly extending transverse end flange 28 having a circular opening 30.

A generally cup-shaped flow control valve member 32 extends through the opening 14 in the flange 12 of the housing section 4 and comprises a cylindrical side wall 34 and a convex bottom wall 36. The cup 32 also includes a rim consisting of a transverse flange portion 38 and a longitudinally extending cylindrical portion 40, which is flared outwardly at its end remote from the flange 38, as indicated to form a rim at 42. The flange 38 of the cup 32 serves as a seat for one end of a compression spring 44, and is stiffened by a series of radial ribs 46, FIG. 3, that extend in a direction away from the flared cup edge 42. The ribs 46 are V-shaped in circumferential cross-section, and each rib has a crest that is engageable with the inner side of the end wall 10 of the housing section 4 when the pressure of the liquid acting on the cup 32 is insufficient to compress the spring 44 and move the cup 32 in a direction toward the flared portion 20, which serves as a limit stop or abutment for said cup.

The cup or valve element 32 can be moved from the full line position shown in FIG. 2, to that shown in dot-and-dash lines with the flared rim 42 engaging the flared shoulder 20. In this connection, it will be noted that the inner diameter of the wall 18 of the housing section 6 is purposely made smaller than the outer diameter of the rim 42. The flange 28 at the outlet end of the housing section 6, serves as a seat for one or more plastic calibrating washers 48, which are inserted into the housing section 6 prior to assembly of the unit and serve as an abutment for one end of the spring 44. With the present design, the washers 48 may be made of different thicknesses to provide for adjustment of the compression of the spring in any desired increments, for example, $\frac{1}{64}$ of an inch. Such adjustment is necessary because at the point of minimum pressure differential, a very slight change in the spring force results in a substantial change in the flow rate to offset this force. The washers 48 also provide for inexpensive spring adjustment, for easily setting the spring force to the desired value, thereby enabling springs with commercial tolerances to meet more critical force requirements.

The housing sections 4 and 6, and the valve element 32 are preferably made of corrosion-resistant metal and are designed for minimum cost, size and weight, which is made possible by deep-drawn punch press fabrication. This method of fabrication permits the use of stainless steel, or other strong, wear and corrosion-resistant material at a minimum cost. The two housing parts 4 and 6 are assembled with the cup 32, spring 44 and/or washers 48, after the unit has been calibrated, by bending the flange 22 of the housing section 6 over the flange 16 of the housing section 4, as indicated at 24, to provide a permanent, tight joint and a rigid mounting shoulder for the unit, as will appear more fully hereinafter. The flow control assembly illustrated in FIG. 2, has a capacity equal to that of a 2 inch valve, but has the unusually low total weight of about 1 pound.

The present flow control insert includes a basic cup design, whereby the use of a different number and arrangement of openings will adapt the same to provide a selected constant flow rate. Thus, for example, a flow rate of 10 to 75 g.p.m., or 20 to 155 g.p.m., can be maintained within a pressure differential range of 2½ to 32, and 7 to 140 p.s.i., respectively.

By way of example, the cup 32 may be provided with one or more ports $a$, and with none or one or more bypass holes $b$. The ports can be designed to provide a flow rate of 7½ g.p.m., 10 g.p.m., or 12.5 g.p.m., as desired. Such ports can be used in multiples to provide flow capacities between 7½ and 75 g.p.m. in 2½ g.p.m. increments. The by-pass holes $b$ can have different diameters to correspond with the flow rates desired. The porting design of the cup 32 does not constitute per se a part of the present invention, but is fully disclosed in co-pending application S.N. 96,298, filed March 6, 1961, now Patent No. 3,131,716.

It will be understood from FIG. 2 that the cup 32 is mounted for substantially free floating movement within the opening 14. This is to say, the cup 32 is free to move longitudinally and transversely slightly relative to opening 14 at all times. In the normal use of the device, the valve cup 32 and the spring 44 function as a substantially free floating assembly, always assuming a position resulting from the equalizing of the hydraulic forces acting on opposite sides of the valve cup area and the mechanical spring force. The result is that the assembly is extremely sensitive and responsive to slight variations in differential pressure.

FIG. 4 illustrates one practical embodiment of the invention in which a single insert is shown installed in a threaded pipe nipple housing 50. The pipe nipple, by way of example, may be a section of 3 inch brass pipe. A shoulder or mounting seat 52 is formed by a flat counterbore in one end of the pipe nipple and the outer edge of the nipple is chamfered on a 45° angle to provide a mounting rim 53. The seat 52 is engaged by the portion 23 of the flange 22, which is designed to withstand all forces resulting from the pressure differential across the valve insert or unit 2. As is shown in the drawing, the rim 53 of the pipe nipple 50 is peened over the flange portion 24 to permanently assemble the rate of flow control unit with the nipple 50. The external threads 54 are not altered, and provide for normal connection to a conventional pipe coupling 56 associated with a pipe 58. The threads 60 at the opposite end of the pipe nipple 50 are unaltered and are adapted to be connected with a coupling 62 associated with a pipe section 64.

The flow through the pipe nipple assembly 2, 50 and pipes 58 and 64 is from right to left, as indicated by the arrow indicating FLOW. The rate of flow through the piping is determined by the capacity for which the insert 2 is designed. The flow rate will be maintained constant, nothwithstanding substantial variations in the pressure on the upstream side of the rate of flow control insert.

FIGS. 5 to 8 illustrate another embodiment of the invention comprising a housing 66 designed to provide for the mounting of up to three rate of flow control inserts therein. The housing 66 is generally cup-shaped and has a flange 68 at one end thereof, and a boss 70 at its opposite end provided with a thread 72 for receiving one end of a pipe 74. The housing 66 includes a dished cover 76 having a central boss 78 provided with an internal thread 80 for receiving one end of a pipe section 82. The cover 76 is secured to the flange 68 by a plurality of cap screws 84, the cover 76 having a groove for receiving a gasket 86 for forming a seal between the cover 76 and flange 68.

The housing 66 contains a transverse wall 88, which divides the housing into an inlet chamber 90 and an outlet chamber 92. The wall 88 is reinforced by three radial webs 94 disposed in the outlet chamber 92. The wall 88 is provided with three circular openings 96 located centrally between adjacent reinforcing webs 94. The openings 96 each have a seat 98 that is substantially complemental in shape to the inclined shoulder 20 and the crimped flange 22 of the rate of flow control insert 2, as is best shown in FIG. 8. The diameter of the openings 96 is preferably only slightly larger than that of the wall portion 18 of the housing section 6, so that the flow control insert fits snugly in the opening.

As is shown in FIG. 6, three rate of flow control inserts 2 are mounted in the housing 66 by means of washers 100 that are clamped against the flange 22 on diametrically opposite sides of each insert, and are secured in place by screws 102 threaded into bosses 103 projecting on opposite sides of reinforcing webs 94. The design of the housing 66 in such that the inserts 2 are positioned as close to each other as is practicable to provide a compact device, and to secure the inserts 2 in place with a minimum of screws 102. As will appear later herein, one or two of the openings 96 may be closed by a circular blank in instances where only one or two flow control insert is or are necessary in the housing 66 to provide a desired maximum flow rate.

FIGS. 9 to 12, inclusive, illustrate another embodiment of the invention wherein the housing is designed to receive up to four rate of flow control inserts. In this embodiment, a simple form of cylindrical housing 104 is employed and may be in the form of cast aluminum to achieve light weight, or may be cast from any suitable material. The housing 104 has inwardly extending reinforcing flanges 106 and 108 at the opposite ends thereof, and a transverse wall 110 extending entirely across the interior of the housing at a point nearly midway between the flanges 106 and 108.

The wall 110 divides the housing 104 into an inlet chamber 112 and an outlet chamber 114. Four radial reinforcing webs 116 extend from the flange 106 to the wall 110 and stiffen the same against line pressure. The wall 110 is provided with circular openings 118, with one opening disposed between each pair of adjacent reinforcing webs 116, so that a total of four openings is present. Each opening 118 is chamfered to provide a beveled seat identical to the seat 98 shown in FIG. 8.

FIG. 10 shows two rate of flow control inserts 2 mounted in diametrically disposed openings 118, with the intermediate openings closed by insert blanks 120. The blanks 120 are preferably dished, as illustrated in FIG. 16, and disposed with the concave side thereof facing the upstream side of the housing. The marginal edge of the insert blanks is crimped over to provide a stiff mounting rim 122. In the design illustrated in FIG. 10, insert-mounting holes 124 are located so that a single washer 126 of appropriate diameter can be used to engage the mounting rim 122 of an insert blank 120 and also engage the mounting flange 22 of the flow control insert, to simultaneously clamp both in position. Screws 128 extend through the washer 126 and into the thread of holes 124, the latter being formed in bosses 129 aligned with the reinforcing webs 116, as in FIG. 10. Due to the compact design, only four screws 128 are required to secure the two insert blanks 120, and the two flow control inserts 2, in fixed relation to the wall 110.

One of the important features of the cylindrical housing design, shown in FIGS. 9 and 11, is that it is adapted to be mounted between the flanges 130 of conventional pipe sections 132. Thus, tie bolts 134 extend through aligned openings 136 in the flanges 130 to clamp the housing section 104 therebetween. Any suitable gasket may be disposed between the flanges 106 and 108 of the housing 104, and the pipe flanges 130. As a simple expedient, a gasket 138 is mounted in each of the pipe flanges 130 and engages one of the flanges 106 and 108, to form a seal therebetween.

The use of two rate of flow control inserts 2 in the housing 104 does not take advantage of the full flow control potential of the housing 104, since two of the openings 118 are blanked off by the insert blanks 120. The inserts 2 mounted in the housing 104 may each have a flow capacity of 75 g.p.m., in which event the maximum rated flow capacity provided would be 150 g.p.m. Obviously, this capacity could be doubled by substituting inserts 2 for the insert blanks 120 to increase the maximum flow capacity to 300 g.p.m., or even more by employing inserts having a rated capacity higher than 75 g.p.m.

The flow control device of FIGS. 9 and 11 incorporates the further feature of a pressure differential indicator and flow rate meter. In this connection, a pressure gauge 140 is mounted upon the stem portion of a conventional 3-way valve 142. One end of the valve is connected by piping 144 with the inlet chamber 112 of the housing 104, and the other end of said valve is connected by suitable fittings and a section of copper tubing 146, with the outlet chamber 114 of said housing. A panel 148 having a flow chart thereon is mounted upon the valve 142 by screws 150. The panel 148 is illustrated in complete detail in FIG. 18. As will be observed, a flow rate chart 152 is provided upon the panel 148 to the left of an operating handle 154 for the valve 142. The flow chart 152 is calibrated to indicate the flow rate in gallons per minute corresponding to the pounds per square inch pressure differential across the flow control inserts. In order to make it possible to ascertain the flow rate corresponding to a given pressure differential, the panel 148 has the letters A and B imprinted thereon, the letter A being located to the left of the axis of the operating handle 154 and the letter B being located in a position 90° therefrom and above the handle.

The panel 148 contains instructions for determining the flow rate by the following specified steps: The first instruction, in effect, is to turn the handle 154 to a horizontal position so that its pointer is aligned with the letter A, and to take a reading of the pressure as indicated by the gauge 140. Instruction 2, in effect, specifies turning the handle to a vertical position so that its pointer is aligned with the position B, and to take another reading of the pressure on gauge 140. Further instructions on the plate 148 require determining the difference between the pressure reading A and the pressure reading B, and which difference constitutes the pressure differential across the flow control device as a whole, and for which a corresponding flow rate is calibrated on the chart 152.

The handle 154 of the valve 142 is connected to a hollow stem 156, FIG. 11, having ports 158 and 160 located on radii 90° apart. The valve stem 156 is illustrated in FIG. 11 in the position corresponding to the disposition of the handle 154 vertical, that is, aligned with the letter B in order to obtain a reading on the gauge 140 of the pressure at the inlet side of the device. That is to say, a reading of the pressure in the inlet chamber 112. It will be apparent that, upon movement of the handle 154 through a 90° angle counter-clockwise, i.e., to a horizontal position aligned with the letter A, the ports 158 and 160 of the stem 156 will be positioned so that the outlet pressure, that is, the pressure in the chamber 114, will be communicated to the gauge 140.

If it is assumed that the pressure reading with the handle 154 in position B is 90 p.s.i. and that the reading corresponding to the handle 154 being disposed in the position A is 80 p.s.i., then B minus A equals 90 minus 80, or 10 p.s.i. The chart 142 contains a calibration indicating that for a pressure differential of 2½ to 32 p.s.i., the flow rate is 150 g.p.m. Therefore, with a pressure differential of 10 p.s.i., as determined above, the chart calibration would indicate that liquid is flowing through the device at the desired rate of 150 g.p.m.

One of the important and significant characteristics of the present invention is that the rate of flow control inserts 2 are capable of very accurately maintaining a substantially constant flow rate over a wide range of pressure differentials. As has been indicated, with a flow pressure differential range of 2½ p.s.i. to 32 p.s.i., the flow rate is substantially constant at 150 g.p.m. Actual tests have shown that this accuracy is maintained at all times within about 5%, regardless of wide variations in pressure on the upstream side of the flow control device.

It will be apparent that by following the procedure described above, the rate of flow for pressure differentials outside the 2½ to 32 p.s.i. range can be determined with the same simplicity.

In order to aid in the correct installation of a flow control device such as illustrated in FIG. 9, a flow direction indicating plate 161 is mounted on the housing 104 adjacent the plate 148. The plate 161 may bear other indicia such as the "WATER FLOW RATE—150 g.p.m.," "PRESSURE ABSORPTION RANGE 2-32 p.s.i.," and "MAXIMUM PRESSURE 175 p.s.i." for which the device is designed.

FIGS. 13, 14 and 15 illustrate another form of the invention wherein a cylindrical housing 162, somewhat similar to the housing 104, is provided with a transverse wall 164 containing an axial opening 166 adapted to receive a rate of flow control insert 2, and which opening is surrounded by six additional, equally spaced openings 168, each adapted to receive either a flow control insert 2 or an insert blank 120.

In FIG. 14, the housing 162 is shown provided with one insert blank 120 and six rate of flow control inserts 2. The inserts 2 and the blank 120 are mounted in the aforementioned openings in the wall 164 by washers 170 and screws 172, similar to the washers 126 and screws 128, previously described.

It will be noted that the screws 172 located closest to the axis of the housing 162 serve to secure the axially disposed insert 2 and two other inserts to the wall 164. Here again, this is made possible by the compact design of the device. As in the previously described structures, the wall 164 is reinforced on the outlet side thereof by webs 174. Likewise, the housing 162 is clamped between pipe flanges 176 by tie bolts 178. Similarly, pipe connections 180 and 182 are mounted in the housing 162 for connection with a pressure indicator (not shown) similar to the gauge 140.

FIG. 19 illustrates a panel 184 similar to the panel 148, but containing a flow chart 186 similar to the chart 152, but calibrated over a slightly different range from that of the flow chart 152. The chart 186 is adapted to be used with a flow control device having a maximum rated flow capacity of 155 g.p.m., with a presure differential range of 7 p.s.i. to 140 p.s.i.

FIG. 17 illustrates a further embodiment of the invention wherein a plate 188, preferably of circular configuration, is provided with reinforcing webs 190 at one side thereof, and with four openings 192, in which there is shown mounted four flow control inserts 2. It will be understood that the assembly shown in FIG. 17 may be mounted within any suitable housing through which there is desired to maintain a uniform flow rate. For example, an assembly, as aforedescribed, may be mounted inside a fuel-water separator, or filter, as a complete flow control system.

It will be understood that various changes in design and arrangement from those specifically disclosed herein may be made without departing from the principles of the invention. It will also be apparent that the flow control insert 2 can be installed by means other than disclosed herein. Likewise, it will be manifest that the housing designs disclosed are such that the flow control inserts are designed to be held in place by normal pressure differential forces, as well as by mechanical means.

It will also be understood that the pressure differential and flow rate indicating means can be installed at any remote location, and further, that the flow charts can be positioned 90° from position presently shown herein. These features permit the installation of the gauge and chart at any location for convenient observation. The two connections to the three-way valve can also be reversed, in that the differential pressure will still be determinable from the gauge.

The expression "rate of flow control insert" as used herein means a unit comprising components arranged and constructed to provide a substantially constant flow rate therethrough corresponding to a given pressure differential range across said unit.

We claim:
1. A liquid flow control device, comprising: a hollow cylindrical housing having an inlet chamber, an outlet chamber and a transverse wall separating said chambers, said transverse wall having a plurality of openings; and reinforcing webs in said outlet chamber connected with said transverse wall at points between said openings; a rate of flow control insert mounted in each of said openings, each of said inserts comprising a generally cylindrical casing having a mounting shoulder engaged with said transverse wall on the inlet side thereof, said casing having means therein for controlling the rate of flow between said housing inlet and outlet chambers; and means fastened to said transverse wall and engaged with said mounting shoulder securing said inserts to said wall.

2. A liquid flow control device as defined in claim 1, wherein an inwardly extending reinforcing flange is located at each end of the housing.

3. In combination, a cylindrical housing having flat ends; a pipe section having a flange engaged with each end of said housing; and bolts securing said housing in position between said flanges, said housing having an inlet chamber, an outlet chamber and a transverse wall separating said chambers, said transverse wall having at least one opening; a rate of flow control insert extending into said opening and comprising a casing including cylindrical inlet and outlet sections arranged in axial alignment, adjacent ends of said sections having inter-engaging flanges permanently securing said sections together and providing a mounting shoulder for said casing; means in said casing for controlling the rate of flow therethrough; and means engaging said mounting shoulder on said casing and securely clamping the same against said wall.

4. A liquid flow control device, comprising: a member having an opening for the flow of liquid therethrough, and having a seat around the inlet side of said opening; a rate of flow control insert extending into said opening from the inlet side thereof, said insert comprising: a casing including cylindrical inlet and outlet sections arranged in axial alignment, the confronting ends of said sections each having an integral, outwardly extending flange thereon, said flanges being in abutment and one thereof including a peripheral rim portion of larger diameter than the other of said flanges, said rim portion being bent over and behind said other flange to interlock said flanges and to permanently secure said sections together, said interlocked flanges providing a mounting shoulder on said casing, said mounting shoulder being seated on said seat; and means in said casing for controlling the rate of flow therethrough; and means carried by said member and engaged with said shoulder to retain said shoulder seated on said seat and said insert assembled with said member.

5. A liquid flow control device as recited in claim 4, wherein said member comprises a pipe having a counterbore at one end thereof, said counterbore providing said seat for said mounting shoulder.

6. A liquid flow control device as defined in claim 5, in which the pipe member is a pipe fitting threaded at its opposite ends.

7. A liquid flow control device, comprising: a housing having an inlet chamber, an outlet chamber, and a transverse wall member separating said chambers, said wall member having at least one opening formed therein and having a seat on the inlet side of said wall; a rate of flow control insert mounted in said opening for controlling the rate of flow of liquid through said housing, said insert comprising a cylindrical casing through which fluid can flow from said inlet chamber to said outlet chamber, and means in said casing for controlling the rate of flow therethrough, said casing including cylindrical inlet and outlet sections arranged in axial alignment, the adjacent ends of said sections having inter-engaging flanges permanently securing said sections together and providing a mounting shoulder engaged with said seat; and means mounted on said wall member and engaged with said shoulder for securing said rate of flow control insert in said opening.

8. A liquid flow control device as defined in claim 7, wherein reinforcing webs are connected to the transverse wall on the outlet chamber side thereof for reinforcing the same.

9. A liquid flow control device as recited in claim 7, wherein said transverse wall has a plurality of openings formed therein, at least one of said openings having a said rate of flow control insert mounted therein; and an insert blank mounted in at least another of said openings and blocking flow therethrough.

10. A liquid flow control device as defined in claim 9, wherein the insert blank has a dished portion extending into its associated opening, and wherein the marginal edge of the insert blank is provided with a flange for engagement by a fastener to secure said blank in said opening.

11. A liquid flow control device as recited in claim 7, including additionally: means connected with said inlet and outlet chambers for measuring the pressure differential across said insert, and means indicating the rate of flow through said insert corresponding to said pressure differential.

12. A liquid flow control device as recited in claim 7 including additionally: a three-way valve; means connecting said three-way valve with said inlet and outlet chambers of said housing, respectively; a pressure gauge connected with said valve, said three-way valve being operable to communicate the pressure in said inlet chamber to said gauge, and to communicate the pressure in said outlet chamber to said gauge, whereby the pressure differential across said rate of flow control insert can be determined; and a flow chart including indicia indicating the rate of flow through said rate of flow control insert corresponding to said pressure differential.

13. A liquid flow control device as recited in claim 4, wherein: said inlet and outlet sections have end walls at their outer ends each provided with an opening; a cup element having a body floatingly disposed in said opening in said inlet section end wall, said body ending in a flange received within said inlet section and engageable with the inner side of said inlet section end wall; and a compression spring between said flange and said outlet section end wall yieldably opposing movement of said cup in a direction toward said outlet section, said cup having a side wall with openings extending therethrough of a size and number to provide for a predetermined rate of flow therethrough at a given pressure differential.

14. A liquid flow control device as recited in claim 4, wherein said member has a beveled seat formed around said opening and facing said mounting shoulder, and wherein the section of said insert received within said opening includes a complementary portion engaged with said beveled seat.

15. A liquid flow control device as recited in claim 7, wherein said housing comprises: a generally cup-shaped body including a bottom wall having a threaded opening for connection with a pipe; and a cover forming a closure for the open end of said body and having a threaded opening for connection with a pipe, said transverse wall member being carried by said cup-shaped body between the ends thereof.

References Cited by the Examiner

UNITED STATES PATENTS

| | | | |
|---|---|---|---|
| 528,360 | 10/1894 | Caldwell | 137—512.1 |
| 788,985 | 5/1905 | Youtz | 137—513.3 |
| 920,716 | 5/1909 | Beckman | 137—513.3 |
| 1,235,558 | 8/1917 | Laval | 137—527 X |
| 1,343,753 | 6/1920 | McBryde | 137—512.1 |
| 2,348,097 | 5/1944 | Smith | 137—599 X |
| 2,744,727 | 5/1956 | Osburn | 137—454.2 |
| 2,804,086 | 8/1957 | Johnston | 137—454.4 |
| 2,826,216 | 3/1958 | Thomas | 137—503 |
| 2,884,002 | 4/1959 | Melton | 137—454.2 |
| 2,941,401 | 6/1960 | Strester | 73—210 |
| 3,000,390 | 9/1961 | Hosking | 137—234.5 |
| 3,103,119 | 9/1963 | Steele | 73—210 |
| 3,104,679 | 9/1963 | Gouirand | 137—557 X |
| 3,131,716 | 5/1964 | Griswold | 137—517 X |

FOREIGN PATENTS

| | | |
|---|---|---|
| 1,237,863 | 6/1960 | France. |
| 366,382 | 12/1938 | Italy. |

ISADOR WEIL, *Primary Examiner.*

ALAN COHAN, *Examiner.*